T. C. JOHNSON.
MILITARY SHOULDER ARM.
APPLICATION FILED NOV. 24, 1915.
1,194,504.
Patented Aug. 15, 1916.
2 SHEETS—SHEET 1.
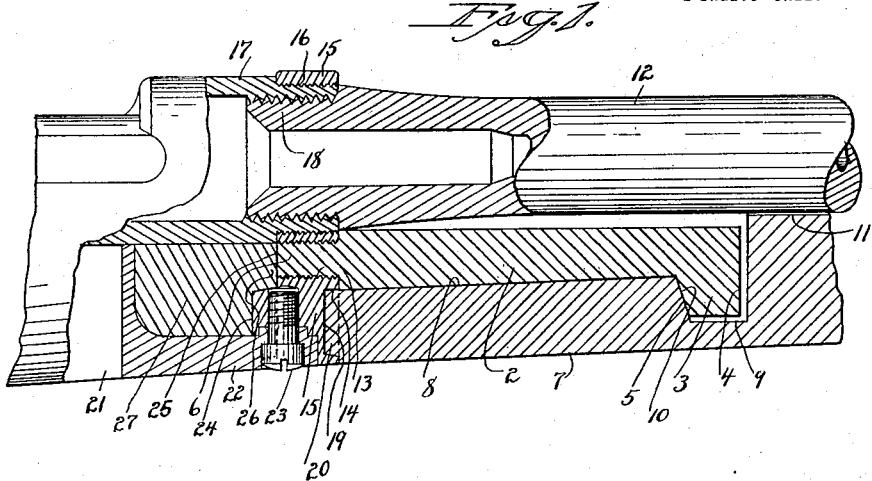
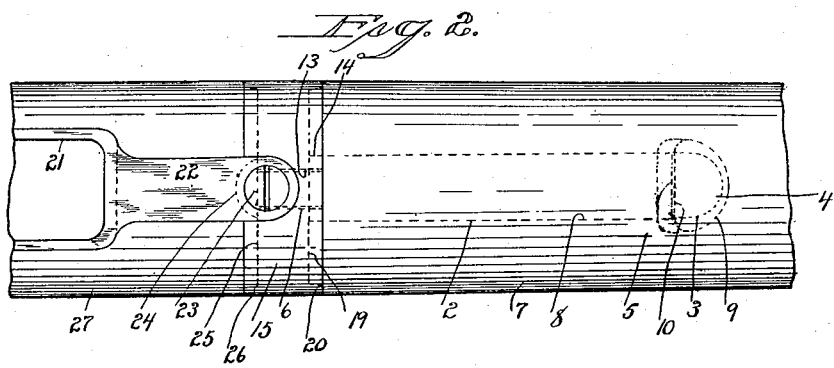
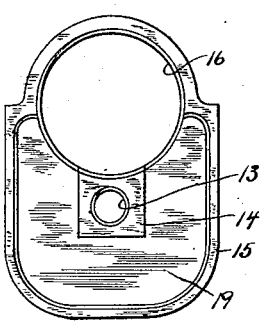
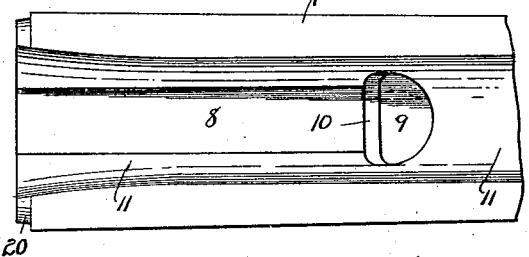

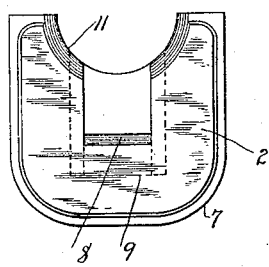
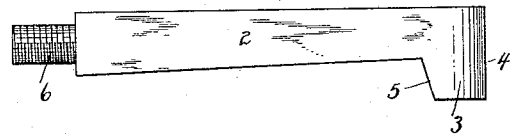
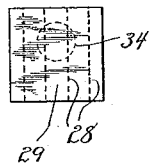
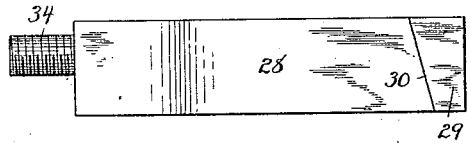
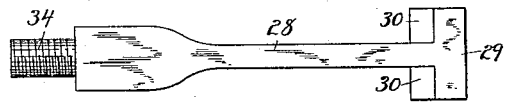
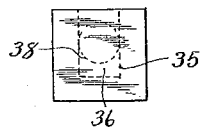
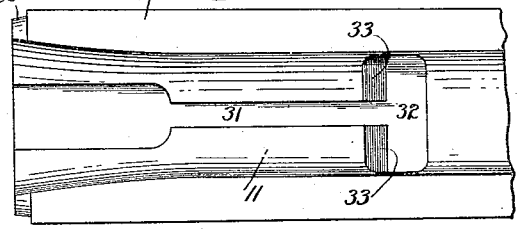
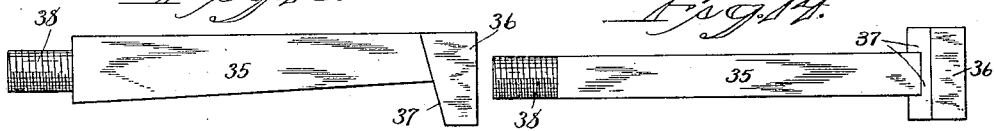
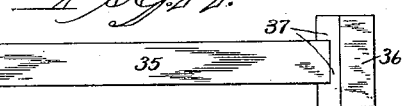

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

MILITARY SHOULDER-ARM.

1,194,504. Specification of Letters Patent. Patented Aug. 15, 1916.

Application filed November 24, 1915. Serial No. 63,243.

*To all whom it may concern:*

Be it known that I, THOMAS C. JOHNSON, a citizen of the United States, residing at New Haven, in the county of New Haven and State of Connecticut, have invented a new and useful Improvement in Military Shoulder-Arms; and I do hereby declare the following, when taken in connection with the accompanying drawings and the characters of reference marked thereon, to be a full, clear, and exact description of the same, and which said drawings constitute part of this application, and represent, in—

Figure 1 a broken view in right hand elevation of a military shoulder-arm constructed in accordance with my invention. Fig. 2 a reverse plan view thereof. Fig. 3 a detached view of the receiver-extension in front elevation. Fig. 4 a broken plan view of the rear end of the forestock. Fig. 5 a detached view of the forestock in rear elevation. Fig. 6 a detached view in side elevation of the forestock-lock. Fig. 7 a reverse plan view thereof. Fig. 8 a detached view in front elevation of one of the modified forms which the forestock-lock may assume. Fig. 9 a view thereof in side elevation. Fig. 10 a reverse plan view thereof. Fig. 11 a broken plan view of the rear end of a forestock recessed to accommodate the forestock-lock shown in Figs. 8, 9 and 10. Fig. 12 a detached view in front elevation of another modified form which the forestock-lock may assume. Fig. 13 a view thereof in side elevation. Fig. 14 a reverse plan view thereof.

My invention relates to an improvement in military shoulder-arms, the object being to provide simple and effective means for holding the forestock of such an arm against forward displacement without imposing any strain whatever upon the gun-barrel.

With these ends in view, my invention consists in a military shoulder-arm having certain details of construction as will be hereinafter described and pointed out in the claims.

In carrying out my invention as shown in Figs. 1 to 7 inclusive, I employ a hook-like forestock-lock having a shank 2 provided at its forward end with a depending locking-lug or anchor 3 having its forward face 4 rounded and its rear face 5 beveled, the said shank being provided at its rear end with a threaded stem 6. For the reception, respectively, of the shank 2 and lug 3 of the said lock, the upper face of the rear end of the forestock 7 is formed with a longitudinal clearance-recess or slot 8 and with a locking-recess 9, the rear wall of which latter is beveled as at 10 to conform to the beveled rear face 5 of the locking-lug 3. The said recesses 8 and 9 intersect each other and lead out of the bottom of the rear end of the longitudinal groove 11 formed in the upper face of the forestock for the clearance of the gun-barrel 12. As shown herein, the threaded stem 6 is screwed into a threaded opening 13 formed in a boss 14 projecting forwardly from the receiver-extension 15 which is formed at its upper end with a threaded opening 16 adapting it to be screwed upon the forward end of the receiver 17 which is provided with a threaded opening for the reception of the threaded-shank 18 of the gun-barrel 12. The forward face of the receiver-extension 15 has a shallow recess 19 for the reception of a short tennon 20 located upon the rear end of the forestock 7. As shown, the box-magazine 21 is formed with a forwardly extending tang 22 the forward end of which receives a screw 23 extending upward through it and into a rearwardly extending lug 24 upon the rear face of the receiver-extension 15 the rear face of which is formed with a shallow recess 25 for the reception of a short tennon 26 upon the forward end of the butt-stock 27.

When the gun is assembled, the bevel 5 upon the rear face of the locking-lug 3 of the forestock lock, co-acts with the beveled rear wall 10 of the locking-recess 9 to crowd the forestock 7 rearwardly into the recess 19 in the receiver-extension 15. When assembled, the forestock lock effectually prevents any forward longitudinal movement of the forestock.

In the modified construction shown by Figs. 8 to 11 inclusive, the forestock lock is formed at the forward end of its shank 28 with a locking-lug or anchor in the form of a T-head 29 arranged transversely with respect to the said shank 28 and projecting equally on opposite sides thereof, the rear face of the said head being beveled as at 30. For the reception of the said forestock lock, the forestock 7 is formed with a clearance recess 31 and a locking-recess 32 which latter corresponds in general form to the T-head 29 and extends on opposite sides of the forward end of the recess 31, the rear face of the recess 32 being beveled at 33 in correspondence with the beveled rear face 30 of the T-head 29. The said shank 28 is provided at its rear end with a threaded stem 34 by means of which it is connected with the receiver 17 through the receiver extension 15. The operation of this modified form of my invention is substantially the same as that of the operation of the form first described.

In the modified construction shown in Figs. 12 to 14 inclusive, the shank 35 of the forestock-lock is formed at its forward end with a transversely arranged locking-lug or anchor 36 extending on opposite sides of the shank 35, and also depending therefrom as clearly shown in Fig. 13, the rear face of the lug 36 being beveled as at 37. The shank 35 is provided in this case with a threaded stem 38 securing the lock to the receiver 17 through the receiver-extension 15.

So far as my present invention is concerned, the receiver-extension might be made integral with the receiver.

The term "receiver" in the claims is to be understood as covering the same whether its extension is integral or otherwise except in those claims in which the receiver-extension is specifically mentioned.

I claim:—

1. In a military shoulder-arm, the combination with the receiver thereof, of a forestock formed forward of its rear end and in its upper face with a downwardly extending locking-recess, and a longitudinally arranged forestock-lock removably connected at its rear end with the said receiver and provided at its forward end with a downwardly extending locking-lug or anchor entering the said recess to hold the said forestock against longitudinal forward movement.

2. In a military shoulder-arm, the combination with the receiver thereof, of a forestock formed forward of its rear end and in its upper face with a downwardly extending locking-recess the rear wall of which is beveled, and a longitudinally arranged forestock-lock removably connected at its rear end with the said receiver and formed at its forward end with a downwardly extending locking-lug adapted to enter the said recess and having its rear face beveled, whereby the forestock is held against longitudinal forward movement.

3. In a military shoulder-arm, the combination with the receiver thereof, of a forestock formed in its upper face with a barrel-clearance groove and with a locking recess leading downwardly out of the bottom of the said groove at the forward end thereof, and a longitudinally arranged forestock-lock removably connected at its rear end with the said receiver, located in the said clearance groove and provided at its forward end with a downwardly extending locking-lug entering the said locking-recess, whereby the forestock is held against longitudinal forward movement.

4. In a military shoulder-arm, the combination with the receiver thereof, of a receiver-extension applied to the forward end of the said receiver, a forestock formed forward of its rear end and in its upper face with a locking-recess, a longitudinally arranged forestock-lock removably connected at its rear end with the said receiver-extension and formed at its forward end with a downwardly extending locking-lug entering the said recess, whereby the forestock is held against longitudinal forward movement.

5. In a military shoulder arm, the combination with the receiver thereof, of a forestock formed in its upper face with a locking-recess, of a forestock-lock removably connected at its rear end with the said receiver and provided at its forward end with a locking-lug or anchor arranged transversely with respect to its shank and projecting on opposite sides thereof and entering the said locking recess to hold the forestock against longitudinal forward movement.

THOMAS C. JOHNSON.

Copies of this patent may be obtained for five cents each, by addressing the "Commissioner of Patents, Washington, D. C."